A. W. Gray,
Horse Power.
Nº 2,833.
Patented Oct. 26, 1842.
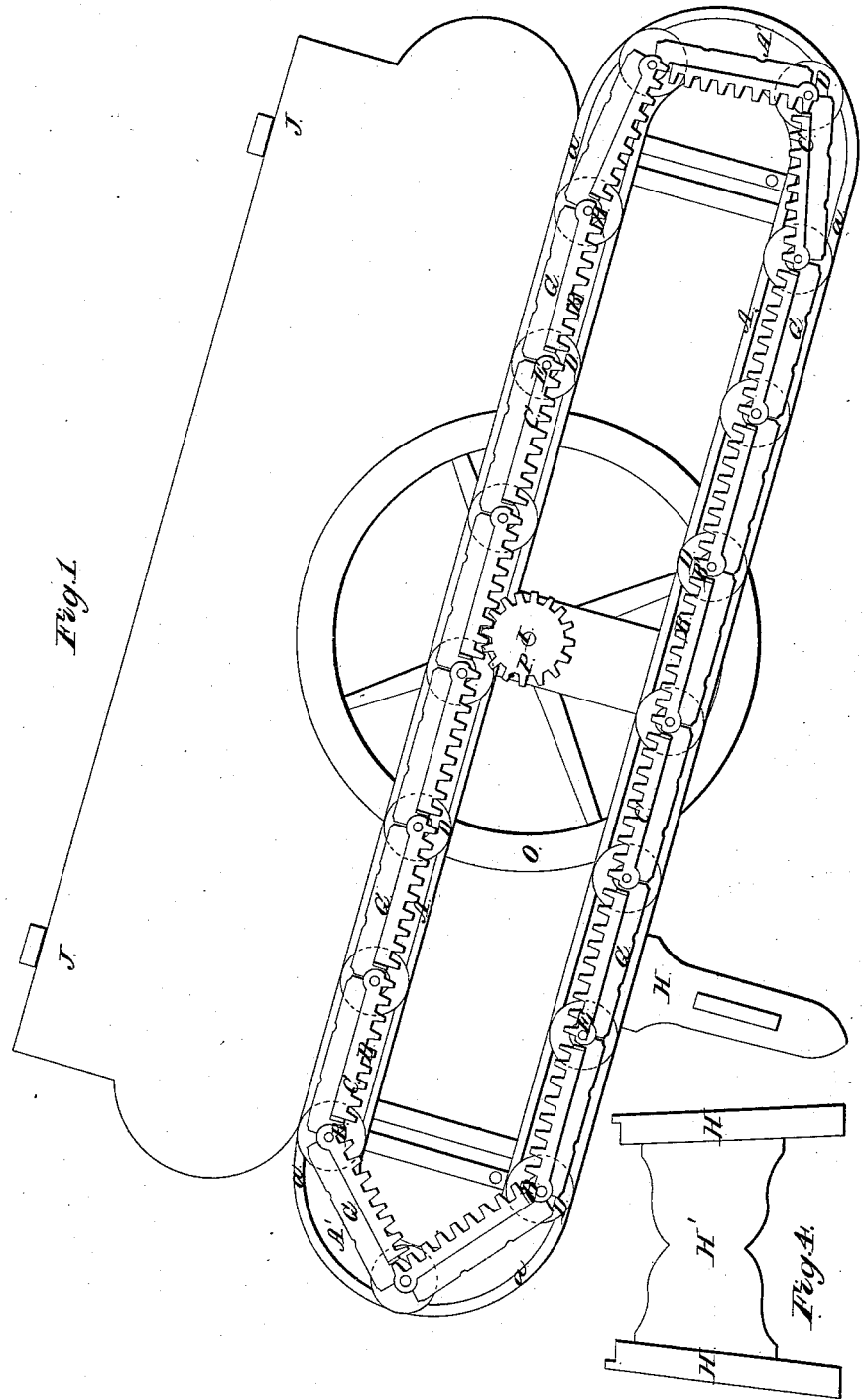

A. W. Gray,
Horse Power.
N° 2,833.  Patented Oct. 26, 1842.
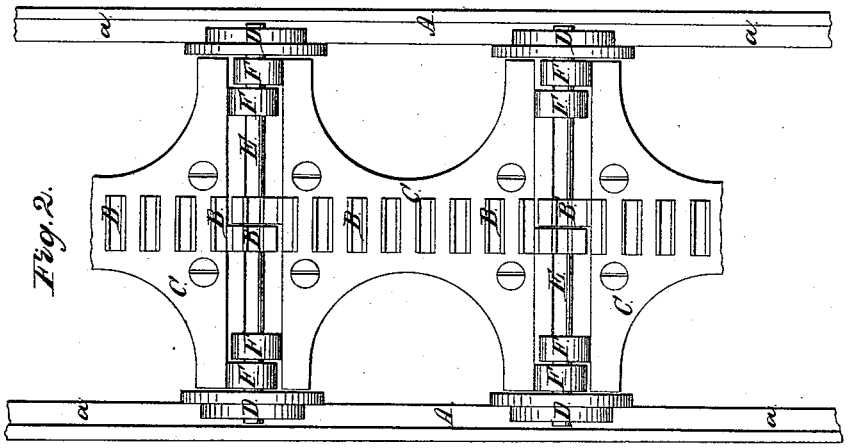
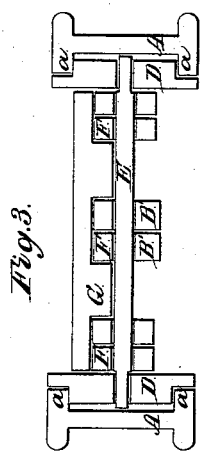

UNITED STATES PATENT OFFICE.

ALBERT W. GRAY, OF MIDDLETOWN, VERMONT.

ENDLESS-CHAIN HORSE-POWER.

Specification of Letters Patent No. 2,833, dated October 26, 1842.

*To all whom it may concern:*

Be it known that I, A. W. GRAY, of Middletown, in the county of Rutland, State of Vermont, have invented a new and useful Improvement in Horse-Power; and I do hereby declare that the following is a full and exact description thereof.

My horse power is of that kind which is actuated by the walking of the animal on an inclined plane formed in sections, which sections are hinged together so as to constitute an endless floor.

My principal improvements consist in the particular manner in which I construct the hinges, or connecting links, by which the sectional pieces constituting the floor are connected with each other; and in the manner in which I regulate the inclination of the floor and support the same.

In the accompanying drawing, Figure 1 represents a vertical section along the middle of the inclined floor, showing the rack in the center, which forms a part of the hinges, or connecting links; and showing a part, also, of the inner side of a cast-iron frame which has ledges around it constituting ways for the support, and passage, of friction rollers. Fig. 2, is an inside view of a portion of the hinges, or connecting links, with the rack teeth formed on them; Fig. 3, is a section along one of the joints by which the hinges, or links, are connected together; Fig. 4, is a movable support, by the shifting of which the inclination of the floor may be regulated at pleasure.

A, A, is a cast-iron frame, the upper and lower portions of which are connected together by its semicircular ends A', A'; from the face of this frame rise ledges, or projecting rims, a, a, a, Fig. 3—which constitute guides between which the friction rollers are received that are placed on the ends of the joint pins of the connecting links; this part is shown most distinctly in Fig. 2, which is drawn to a scale of double the proportion of Fig. 1.

B, B, B, B, are the rack teeth which are cast on the hinges, or links, C, C; those marked B', being divided in the middle, so that one half the tooth only is on one link, or hinge.

D, D, are friction rollers, which are placed on the ends of the joint pins, or bolts, E, E, by which the links are connected together.

F, F, are stout knuckles, through which the bolts E, pass. Each hinge or link, is attached to a platform of wood, say two feet six inches square, more or less, these platforms constituting the sectional parts of the endless floor; grooves should be made across the upper faces of these sections, to give hold to the feet of the horse.

In Figs. 1, and 3, G, G, are the sections of the floor.

The bolts E, E, pass through three pair of knuckle joints at each connection of the hinges; that is, through F, F, at each end, and through bolt holes formed immediately back of the half teeth B', B', as seen in the sections, Figs. 1, and 3.

P, is a pinion on a shaft I, which pinion gears into the teeth B, B, of the rack; on one end of the shaft I, I place a fly wheel O, and from said shaft, also, I communicate motion to a thrashing machine, or to any other to which the power is to be applied.

H, Figs. 1, and 4, is a movable support, which I use to regulate the inclination of the platform; it consists simply of two cheek pieces H, H, connected together by a cross tie H'. The cheeks H, H, are rebated at their upper ends, so as to embrace the cast-iron frame A, A. This support may be placed near to one end of said frame, or it may be made to advance to any required distance from the end toward the middle, and thus to increase the inclination of the floor in any desired degree. One end of the frame A, A, may be allowed to rest upon a piece of plank placed upon the ground. On each side of the machine, I place movable fences of plank J, J, which may be attached to the iron frames by two screw bolts, or otherwise. It will be seen that by this arrangement, the machine is rendered eminently portable; as by removing two bolts from each of the side fences, the iron frame, with its endless floor, is disencumbered from every other part, the movable support not being in any way attached thereto, but remaining in place, when in use, from the pressure of the superincumbent weight.

Having thus fully described the manner in which I construct my horse power, and shown the use of the respective parts thereof, what I claim as new therein, and desire to secure by Letters Patent, is—

The particular manner in which I have formed and connected the hinges, or links, with their racks; said hinges extending from side to side, and from edge to edge, of each of the sectional pieces constituting the movable floor, and the bolts passing through three pair of knuckle joints in each, and being otherwise constructed and arranged as above set forth.

I do not claim the use of racks and pinions in combination with an endless floor; nor do I claim the employment of cast-iron frames and ways, such as are represented at A, A; nor, in fine, do I make claim to any other part, or arrangement of parts, of the above-described apparatus, excepting those above specifically designated.

ALBERT W. GRAY.

Witnesses:
C. B. HARRINGTON,
E. ROSS.